Patented Sept. 5, 1933

1,925,311

UNITED STATES PATENT OFFICE 1,925,311

PROCESS FOR THE MANUFACTURE OF ALIPHATIC KETONES

Henry Dreyfus, London, England

No Drawing. Application July 28, 1930, Serial No. 471,417, and in Great Britain August 19, 1929

23 Claims. (Cl. 260—134)

This invention relates to the manufacture of ketones and especially to the manufacture of acetone.

According to the invention I have found that aliphatic ketones (and especially acetone) can be produced by subjecting the vapours of primary aliphatic alcohols containing at least two carbon atoms or of their aldehydes or organic esters (and especially vapours of ethyl alcohol or acetaldehyde or ethyl acetate) in admixture with oxygen or a gas containing the same, such for instance as air, to the action of high temperatures in presence of a catalyst composed of one or more oxides, hydroxides, carbonates or other compounds—particularly weak acid salts such for instance as borates, phosphates, or silicates—of the alkali earth metals containing the alkali earth metals as the sole metallic elements.

As examples of the catalysts may be mentioned:—the oxides, hydroxides, carbonates, meta borates, normal, meta and pyrophosphates, and silicates of calcium barium and magnesium, and mixtures of two or more of such bodies.

The catalysts may, if desired, be employed spread upon, or deposited upon filling or contact materials such for instance as kieselguhr or the like.

The reaction of the invention may be performed at temperatures between about 250° and 700° C., and especially at temperatures between about 350° and 550° C.

The mixture of the alcohol vapour (or of the aldehyde or organic acid ester) and oxygen, air (or other gaseous mixture containing free oxygen) may be submitted to the reaction in any convenient way. As for instance the mixture may be passed in a rapid stream through a tube or other form of apparatus (e. g. a tube or apparatus of copper, iron, staybrite, earthenware or the like) filled or provided with the catalyst and heated to the desired temperature.

It is to be understood that I do not limit myself as to the pressure to be employed, as the process may be performed under normal atmospheric pressure or under reduced pressure or "vacuum" or under elevated pressures such for instance as from 2 to 10 or more atmospheres.

For the purposes of the invention I preferably employ mixtures of the alcohol vapour (or aldehyde or organic acid ester) and oxygen (or gaseous mixture containing the same) containing more than two molecules of oxygen relatively to each molecule of the alcohol (or relatively to each two molecules of the aldehyde or organic acid ester where such is employed) or even containing substantially large proportions of oxygen e. g. containing from 5 to 20 or more parts by volume of oxygen to each volume of the alcohol or aldehyde or organic acid ester.

If desired the process may be performed in presence of water vapour and/or aliphatic acid (e. g. acetic acid) vapour, and such vapour or vapours may, if desired, be introduced in relatively large amounts such for instance as about 2 to 20 or more times the volume of that of the vapour of the alcohol or aldehyde or organic acid ester.

The following example serves to illustrate a convenient form of execution of the invention but it is to be understood that it is in no way limitative.

Example

A mixture of ethyl alcohol vapour, oxygen, and acetic acid vapour in about the proportions 1:5:1 by volume is passed through a tube (e. g. of copper) or other form of apparatus filled or provided with a catalyst composed of calcium oxide or calcium silicate and maintained at a temperature of about 430–480° C. There results a copious yield of acetone, which may be purified if desired, by fractional distillation.

What I claim and desire to secure by Letters Patent is:—

1. Process for the manufacture of an aliphatic ketone, which comprises subjecting the vapor of a body of formula $C_nH_{2n+1}R$, where R is a primary alcohol group $CH_2OH$ or an aldehyde group or an aliphatically esterified carboxylic acid group, to reaction with free oxygen at elevated temperatures in presence of a catalyst composed of a compound of an alkaline earth metal containing the alkaline earth metal as the sole metallic element.

2. Process for the manufacture of an aliphatic ketone, which comprises subjecting the vapor of a body of formula $C_nH_{2n+1}R$, where R is a primary alcohol group $CH_2OH$ or an aldehyde group or an aliphatically esterified carboxylic acid group, to reaction with free oxygen at elevated temperatures in presence of a catalyst composed of an alkaline earth salt of a weak acid.

3. Process for the manufacture of an aliphatic ketone, which comprises subjecting a vaporous mixture comprising the vapor of a body of formula $C_nH_{2n+1}R$, where R is a primary alcohol group $CH_2OH$ or an aldehyde group or an aliphatically esterified carboxylic acid group, and free oxygen to the action of elevated temperatures in presence of a catalyst composed of a compound of an alkaline earth metal containing the alkaline earth metal as the sole metallic element.

4. Process for the manufacture of an aliphatic ketone, which comprises subjecting a vaporous mixture comprising the vapor of a body of formula $C_nH_{2n+1}R$, where R is a primary alcohol group $CH_2OH$ or an aldehyde group of an aliphatically esterified carboxylic acid group, and free oxygen to the action of elevated temperatures in presence of a catalyst composed of an alkaline earth salt of a weak acid.

5. Process for the manufacture of an aliphatic ketone, which comprises subjecting a vaporous mixture comprising the vapor of a body of formula $C_nH_{2n+1}R$, where R is a primary alcohol group $CH_2OH$ or an aldehyde group of an aliphatically esterified carboxylic acid group, and free oxygen to the action of elevated temperatures in presence of a catalyst composed of a calcium salt of a weak acid.

6. Process for the manufacture of an aliphatic ketone, which comprises subjecting a vaporous mixture comprising the vapor of a body of formula $C_nH_{2n+1}R$, where R is a primary alcohol group $CH_2OH$ or an aldehyde group or an aliphatically esterified carboxylic acid group, and free oxygen to the action of elevated temperatures in presence of a catalyst composed of calcium silicate.

7. Process for the manufacture of an aliphatic ketone, which comprises subjecting a vaporous mixture comprising the vapor of a body of formula $C_nH_{2n+1}R$, where R is a primary alcohol group $CH_2OH$ or an aldehyde group of an aliphatically esterified carboxylic acid group, and free oxygen to a temperature between 250° and 700° C. in presence of a catalyst composed of a compound of an alkaline earth metal containing the alkaline earth metal as the sole metallic element.

8. Process for the manufacture of an aliphatic ketone, which comprises subjecting a vaporous mixture comprising the vapor of a body of formula $C_nH_{2n+1}R$, where R is a primary alcohol group $CH_2OH$ or an aldehyde group of an aliphatically esterified carboxylic acid group, and free oxygen to a temperature between 350° and 550° C. in presence of a catalyst composed of an alkaline earth salt of a weak acid.

9. Process for the manufacture of an aliphatic ketone, which comprises subjecting a vaporous mixture comprising the vapor of a body of formula $C_nH_{2n+1}R$, where R is a primary alcohol group $CH_2OH$ or an aldehyde group or an aliphatically esterified carboxylic acid group, and free oxygen to a temperature between 350° and 550° C. in presence of a catalyst composed of a calcium salt of a weak acid.

10. Process for the manufacture of an aliphatic ketone, which comprises subjecting a vaporous mixture comprising the vapor of a body of formula $C_nH_{2n+1}R$, where R is a primary alcohol group $CH_2OH$ or an aldehyde group or an aliphatically esterified carboxylic acid group, and free oxygen to a temperature between 350° and 550° C. in presence of a catalyst composed of calcium silicate.

11. Process for the manufacture of acetone, which comprises subjecting the vapor of ethyl alcohol to reaction with free oxygen at elevated temperatures in presence of a catalyst composed of a compound of an alkaline earth metal containing the alkaline earth metal as the sole metallic element.

12. Process for the manufacture of acetone, which comprises subjecting a vaporous mixture of ethyl alcohol and free oxygen to the action of elevated temperatures in presence of a catalyst composed of a compound of an alkaline earth metal containing the alkaline earth metal as the sole metallic element.

13. Process for the manufacture of acetone, which comprises subjecting a vaporous mixture of ethyl alcohol and free oxygen to a temperature between 250° and 700° C. in presence of a catalyst coposed of a compound of an alkaline earth metal containing the alkaline earth metal as the sole metallic element.

14. Process for the manufacture of acetone, which comprises subjecting a vaporous mixture of ethyl alcohol and free oxygen to a temperature between 350° and 550° C. in presence of a catalyst composed of an alkaline earth salt of a weak acid.

15. Process for the manufacture of acetone, which comprises subjecting a vaporous mixture of ethyl alcohol and free oxygen to a temperature between 350° and 550° C. in presence of a catalyst composed of a calcium salt of a weak acid.

16. Process for the manufacture of acetone, which comprises subjecting a vaporous mixture of ethyl alcohol and free oxygen to a temperature between 350° and 550° C. in presence of a catalyst composed of calcium silicate.

17. Process for the manufacture of an aliphatic ketone, which comprises subjecting a vaporous mixture comprising between 5 and 20 volumes of oxygen and 1 volume of a body of formula $C_nH_{2n+1}R$, where R is a primary alcohol group $CH_2OH$ or an aldehyde group or an aliphatically esterified carboxylic acid group, to the action of elevated temperatures in presence of a catalyst composed of a compound of an alkaline earth metal containing the alkaline earth metal as the sole metallic element.

18. Process for the manufacture of acetone, which comprises subjecting a vaporous mixture comprising acetaldehyde and oxygen to the action of elevated temperatures in presence of a catalyst composed of a compound of an alkaline earth metal containing the alkaline earth metal as the sole metallic element.

19. Process for the manufacture of acetone, which comprises subjecting a vaporous mixture comprising acetaldehyde and oxygen to the action of elevated temperatures in presence of a catalyst composed of calcium silicate.

20. Process for the manufacture of acetone, which comprises subjecting a vaporous mixture comprising acetaldehyde and oxygen to a temperature between 250° and 700° C. in presence of a catalyst composed of a compound of an alkaline earth metal containing the alkaline earth metal as the sole metallic element.

21. Process for the manufacture of acetone, which comprises subjecting a vaporous mixture comprising acetaldehyde and oxygen to a temperature between 250° and 700° C. in presence of a catalyst composed of calcium silicate.

22. Process for the manufacture of acetone, which comprises subjecting a vaporous mixture comprising between 5 and 20 volumes of oxygen and 1 volume of alcohol vapor to a temperature between 350° and 550° C. in presence of a catalyst composed of calcium silicate.

23. Process for the manufacture of acetone, which comprises subjecting a vaporous mixture comprising between 5 and 20 volumes of oxygen and 1 volume of acetaldehyde vopor to a temperature between 350° and 550° C. in presence of a catalyst composed of calcium silicate.

HENRY DREYFUS.